United States Patent Office 3,390,955
Patented July 2, 1968

3,390,955
SODIUM CALCIUM METABORATE
Joseph Dulat, Surrey, England, assignor to United States Borax & Chemical Corporation, Los Angeles, Calif.
No Drawing. Continuation-in-part of application Ser. No. 472,346, July 15, 1965. This application Apr. 18, 1967, Ser. No. 631,587
Claims priority, application Great Britain, Feb. 3, 1967, 5,417/67
9 Claims. (Cl. 23—59)

ABSTRACT OF THE DISCLOSURE

Sodium calcium metaborate of the formula $$3Na_2O \cdot 2CaO \cdot 5B_2O_3$$

is provided. The compound, which has a sharp melting point of 880±2° C., is useful in the production of glass, ceramics and enamels, as a flux and as a lubricant in the hot-drawing of metals. The compound is obtained as crystals from an anhydrous melt containing $Na_2O$, $CaO$ and $B_2O_3$, preferably in a molecular ratio of about 3:2:5.

This application is a continuation in part of my copending application Ser. No. 472,346 filed July 15, 1965 and now abandoned.

This invention relates to alkaline earth metal borates, more particularly to a novel sodium calcium borate, and to the production of said borate.

The sodium calcium borate, ulexite $$(Na_2O \cdot 2CaO \cdot 5B_2O_3 \cdot 16H_2O)$$

occurs widely in nature. While it provides a valuable starting material for the production of other borates, its direct use in industry has been restricted by the readiness with which much of its sodium content can be leached out with cold water.

This invention provides a new sodium calcium borate having only a small water-soluble sodium content and which has a high boric oxide content. The borate of this invention also has a very good resistance to hydration by atmospheric moisture which is in direct contrast to the rapid absorption of moisture by sodium metaborate.

The invention in one aspect comprises a sodium calcium borate in which the molar proportions of $Na_2O$, $CaO$ and $B_2O_3$ are in the ratios 3:2:5, respectively, which can be named sodium calcium metaborate. In a further aspect, the invention comprises a process for producing the sodium calcium metaborate.

The process according to this invention comprises forming an anhydrous melt containing $Na_2O$, $CaO$ and $B_2O_3$, cooling the melt so as to form crystals, and collecting the crystals from any other residue of the melt. Thus, the anhydrous melt can preferably have its $Na_2O$, $CaO$ and $B_2O_3$ in the molecular ratio 3:2:5. However, it is not necessary to form a melt of this exact composition; the metaborate of the invention can be crystallized, for example, from a melt of a 2:1:3 ratio and from a melt of a 2:2:4 ratio, and from a melt of an intermediate ratio such as 2:1:4.

The melt is formed by heating a mixture of two or more materials which between them provide the necessary $Na_2O$, $CaO$, and $B_2O_3$. A variety of starting materials can be used in the production of the melt, for example sodium borates such as borax and sodium metaborate, calcium borates, calcium oxide, sodium calcium borates, and boric oxide. Other compounds such as calcium carbonate, calcium hydroxide or boric acid, which decompose to give a constituent of the melt at or below the temperature to which the charge is heated, can also be used as starting materials. A suitably constituted mixture of two or more of these materials is heated until a melt of the required composition is obtained. Desirably anhydrous starting materials are employed, but hydrated materials may be used provided the water of hydration is driven off before the melt is cooled. Preferably when a pure product is required sodium borates (anhydrous or hydrated), boric oxide or boric acid, and calcium oxide or hydroxide (all of a known standard purity) are used as starting materials. Particularly preferred mixtures of starting materials are anhydrous sodium metaborate ($Na_2O \cdot B_2O_3$), boric oxide and calcium oxide in a molar ratio of 3:2:2, and anhydrous sodium tetraborate, anhydrous sodium metaborate, and calcium oxide in a molar ratio of 2:1:2. In the production of a commercial product, calcium borate ores, e.g. Colemanite, Meyerhofferite, Inyoite, and Pandermite; sodium calcium borate ores, e.g. Probertite and Ulexite; burnt or hydrated lime, or limestone; crude sodium borate ores, e.g. Kernite; and crude boric acid can be used as starting materials.

In the process of this invention, it is preferred to form an intimate mixture of the starting materials, to heat them until the mixture has entirely melted, and then to quench the melt by pouring it onto a cool surface, desirably provided with cooling means, as for example a jacket through which water or other cooling fluid flows. The melt can also be cooled in the vessel in which it is formed, in which case it is desirable to provide means for speeding up the rate of cooling, for example by means of a jacket around the vessel or pipes within it through which cooling fluid flows. The cooled melt can be comminuted, such as by grinding in conventional equipment when it has cooled to room temperature, but desirably grinding is effected before the melt has completely cooled, e.g. at a temperature between about 50° C. and about 300° C.

The temperature at which the charge will melt naturally depends on the particular starting materials used. For the preferred mixtures of starting materials, namely anhydrous sodium tetraborate, anhydrous sodium metaborate and calcium oxide in a molar ratio of 2:1:2, and also anhydrous sodium metaborate, boric oxide and calcium oxide in a molar ratio of 3:2:2, the charge will normally be heated to a temperature of about 1100° C. or higher. Once the charge has completely melted, further heating is unnecessary and the melt can be cooled immediately.

The same sodium calcium borate, but in the form of irregular crystals, can be prepared from mixtures of the composition given above by allowing the melts to cool slowly, particularly within the temperature range 880°–890° C., and crushing the resulting solid in a manner to avoid excessive comminution or excessive grinding action.

When well defined and large crystals of $$3Na_2O \cdot 2CaO \cdot 5B_2O_3$$

are required, as for example for scientific studies these can be obtained from sodium calcium borate melts differing in composition from the stoichiometric composition of the product. Thus crystals can be grown from melts with compositions $1Na_2O : 1CaO : 2B_2O_3$ and $$2Na_2O : 1CaO : 4B_2O_3$$

but the preferred composition for growing especially large crystals is $2Na_2O : 1CaO : 3B_2O_3$. This composition is obtained by melting equimolar quantities of anhydrous sodium tetraborate, anhydrous sodium metaborate and calcium oxide or by melting together anhydrous sodium metaborate, boric oxide, and calcium oxide in the molar ratio of 2:1:1.

The metaborate of this invention has a sharp melting point of 880±2° C. It absorbs moisture from the air very slowly and is relatively slow to dissolve in water.

The sodium calcium borate of this invention is suitable for use at a frit component in the production of glass, ceramics and enamels, as a flux and as a lubricant in the hot-drawing of metals. The compound has a surprisingly high wetting effect when melted with additional $B_2O_3$ which is especially advantageous in the formation of ceramic glazes and porcelain enamels.

The invention is illustrated by the following examples, but it is not to be considered limited to the specific examples given.

EXAMPLE I

Anhydrous sodium tetraborate, anhydrous sodium metaborate, and calcium oxide were heated separately to 1100° C., held at that temperature for 30 minutes, allowed to cool to 100°–300° C. in a dry atmosphere, crushed while hot and then stored in an airtight container.

Equimolar amounts of each component were mixed together and heated at 1100° C. for 30 minutes. This gave a melt having $Na_2O$, $CaO$ and $B_2O_3$ in the ratio 2:1:3. The temperature of the melt was lowered gradually from about 1100° C. until the solidification just about commenced to set in. The temperature of the mixture was then maintained approximately level for a period of time of the order of one hour after which the crucible containing the mixture was removed from the furnace and emptied rapidly of the remaining liquid. Small but well-defined crystals were found on the underside of the solid crust adhering to the walls of the crucible. These small crystals were detached and used as seed in further similar preparations until large crystals (though not necessarily single crystals) reaching 10 mm. x 5 mm. x 5 mm. in size were obtained.

EXAMPLE II

A mixture of anhydrous sodium metaborate, dried boric oxide and dried calcium oxide in a molar ratio 2:1:1 was prepared, formed into a melt, and cooled to provide crystals by the same procedure as in Example I.

EXAMPLE III

A melt of $Na_2O:CaO:B_2O_3$ ratio 3:2:5 was prepared from sodium metaborate, boric oxide and calcium oxide in the molar ratio 3:2:2 and allowed to cool by the same procedures as in Example I. A mass of very small crystals was obtained, whose X-ray diffraction pattern and analytical results were the same as for the crystals obtained in Example I.

EXAMPLE IV

Sodium tetraborate, sodium metaborate and calcium oxide were mixed in the molar ratio 2:1:2 and the mixture was melted and cooled by the same procedures as Example I. A mass of small crystals like those made in Example III was formed.

EXAMPLE V

A melt was prepared from a mixture of anhydrous borax and calcium oxide in the molar ratio 2:1. No attempt was made to separate the crystals from the cooled solidified mass. The X-ray pattern of the ground sample was identical to that obtained from $3Na_2O:2CaO:5B_2O_3$ obtained in Example I, as the extraneous materials present in the sample did not show up in the region examined.

EXAMPLE VI

A melt was prepared from a mixture of anhydrous borax and calcium oxide in the molar ratio 1:1. After cooling to room temperature it was found that a crystalline material had separated from the glass-like matrix. These crystals had an X-ray pattern identical to that obtained from $3Na_2O:2CaO:5B_2O_3$ as prepared in Example I.

Results

The crystals produced by Example I were analyzed and examined with the following results:

(i) Visual examination

In a preliminary cursory visual examination the shape of the crystals appeared to be rhombohedral, the acute angle between two edges at the apex of the rhombohedron being aproximately 80°. However, the result of an observation under the polarizing microscope showed the crystals to have two optic axes which fact eliminates the possibility of the crystals belonging to the rhombohedral system.

(ii) Chemical analysis

The results of two chemical analyses carried out independently are given in Table 1.

TABLE 1.—ANALYSIS OF CRYSTALLINE SODIUM CALCIUM BORATE

| Component | Percent (w./w.) Found | | Theoretical Percentage in $3Na_2O \cdot 2CaO \cdot 5B_2O_3$ |
|---|---|---|---|
| | 1 | 2 | |
| Soda ($Na_2O$) | 28.1 | 29.4 | 28.77 |
| Lime ($CaO$) | 17.7 | 17.6 | 17.35 |
| Boric Oxide ($B_2O_3$) | 54.8 | 53.6 | 53.88 |

(iii) X-ray analysis

A small sample of a dry crystal was ground rapidly in a preheated agate mortar and introduced into a dry, thin-walled soft glass tube which was immediately sealed. The powder diffraction pattern photographs obtained with the test sample and with samples of anhydrous sodium metaborate and calcium metaborate indicate that sodium metaborate and calcium metaborate are not present as crystals in detectable amount in the product. The principal $d$ spacings are listed in Table 2.

TABLE 2.—PRINCIPAL $d$ SPACING IN X-RAY DIFFRACTION PATTERNS OF CRYSTALLINE BORATES

| 1 | 2 | 3 |
|---|---|---|
| $3Na_2O \cdot 2CaO \cdot 5B_2O_3$ | $Na_2O \cdot B_2O_3$ (Control) | $CaO \cdot B_2O_3$ (Control) |
| 6.2 m— | | |
| 4.6 f | | |
| 3.7 f | | |
| | | 3.4 s |
| 3.27 f | | |
| 3.21 s | | |
| 3.10 s+ | | |
| | 3.09 s | |
| | | 3.02 s+ |
| | 2.76 s | |
| 2.72 m | | |
| 2.64 m | 2.64 s+ | |
| | | 2.62 m |
| 2.58 f | | |
| | 2.50 m | |
| 2.43 f(B) | | |
| 2.30 f(B) | | |
| | 2.24 s | 2.24 f |
| 2.15 f | 2.15 m— | |
| | | 2.14 s |
| | | 2.11 f |
| | 2.03 m | |
| 2.01 f | | |
| | 2.00 s | 2.00 f |
| | | 1.95 s |
| | 1.92 f | |
| 1.90 f(B) | | |
| | 1.88 m | |
| 1.87 f | | |
| | | 1.84 m |
| 1.83 f(B) | | |
| 1.79 m | 1.79 m | |

The spacings are given in angstroms (A); the relative intensities of the lines are indicated by the symbols: $s+$ very strong; $s=$ strong; $m=$ medium; $m-=$ medium to faint; $f=$ faint; $f-=$ very faint; and $B=$ board line.

(iv) Melting point

A sharp melting point was observed both on cooling the liquid of the composition $3Na_2O:2CaO:5B_2O_3$ and on heating the solid crystal. The melting point determined by the cooling curve method was found to be 882° C.

(v) Density

The density of the crystalline material was determined using a standard density bottle and di-n-butyl phthalate as the fluid. The density of the crystals at 25° C. was found to be 2.19 g./cc.

(vi) Effect of water

The effect of water on the crystals was examined by stirring a large excess of the solid (25 grams) in water (100 ml.) at 25° C. Aliquots of solution were taken at suitable time intervals and analyzed. The solid remaining after 72 hours stirring was also analyzed. After stirring 25 gram portions of crystals in 100 ml. of $CO_2$-free water at 25° C. for 2½ hours, 0.53 gram of the material (of which about 0.07 gram was CaO) went into solution; after 20 hours stirring the weight dissolved amounted to 1.78 grams of which only about 0.02 gram was CaO. After 72 hours stirring the solid residue left was found to be practically all $CaO \cdot B_2O_3 \cdot 6H_2O$.

(vii) Moisture absorption

The rate of moisture absorption at 65% relative humidity was determined on a $-100 +150$ B.S. mesh fraction of the ground crystals and compared with that of anhydrous sodium metaborate tested under similar conditions. Moisture absorption data obtained with a sample of the crystalline test material and with a sample of anhydrous sodium metaborate control are given in Table 3. The materials tested were ground rapidly and 5 gram portions of $-100 +150$ B.S. mesh fractions were used in tests at 65% R.H.

TABLE 3.—MOISTURE ABSORPTION BY THE SODIUM CALCIUM METABORATE AND SODIUM METABORATE

| | Water Absorbed, percent (by weight of anhydrous material) | |
|---|---|---|
| | $3Na_2O \cdot 2CaO \cdot 5B_2O_3$ | $Na_2O \cdot B_2O_3$ |
| Exposure Time (days): | | |
| 1 | 0.64 | 5.7 |
| 2 | 0.9 | 9.2 |
| 6 | 1.8 | 20.8 |
| 9 | 2.0 | 29.4 |
| 14 | 2.5 | 42.5 |

The products of Example II and Example III gave similar analytic and X-ray results as the product of Example I.

Various changes and modifications of the invention can be made and, to the extent that such variations incorporate the spirit of this invention, they are intended to be included within the scope of the appended claims.

I claim:
1. Sodium calcium borate of the formula

$$3Na_2O \cdot 2CaO \cdot 5B_2O_3$$

2. Sodium calcium metaborate according to claim 1 having a melting point of 880±2° C.

3. The process for producing sodium calcium metaborate of the formula $3Na_2O \cdot 2CaO \cdot 5B_2O_3$ which comprises forming an anhydrous melt containing $Na_2O$, CaO and $B_2O_3$, in a molecular ratio of from about 2:1:3 to about 2:2:4, cooling the melt so as to form crystals, and collecting the crystals of said sodium calcium metaborate from any other residue of the melt.

4. The process according to claim 3 wherein said anhydrous melt is formed by heating a mixture of materials selected from the oxides and borates of sodium and calcium.

5. The process according to claim 3 wherein said melt has the approximate composition $3Na_2O \cdot 2CaO \cdot 5B_2O_3$.

6. The process according to claim 3 wherein said melt is formed from a mixture of anhydrous sodium metaborate, boric oxide and calcium oxide in a molar ratio of 3:2:2, respectively.

7. The process according to claim 3 wherein said melt is formed from a mixture of anhydrous sodium tetraborate, anhydrous sodium metaborate and calcium oxide in a molar ratio of 2:1:2.

8. The process according to claim 6 wherein said mixture is heated to a temperature of at least about 1100° C.

9. The process according to claim 7 wherein said mixture is heated to a temperature of at least about 1100° C.

References Cited

UNITED STATES PATENTS 3,186,791  6/1965  Kloepfer et al. _____ 23—59

OTHER REFERENCES

Christ, "The American Mineralogist," vol. 45, March–April, 1960, pp. 334–340.

OSCAR R. VERTIZ, *Primary Examiner.*

HERBERT T. CARTER, *Examiner.*